(12) United States Patent
Koda et al.

(10) Patent No.: US 8,403,566 B2
(45) Date of Patent: Mar. 26, 2013

(54) ROLLING BEARING AND ROLLING BEARING APPARATUS

(75) Inventors: Kanichi Koda, Kashiba (JP); Tadashi Fukao, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 332 days.

(21) Appl. No.: 12/312,461

(22) PCT Filed: Nov. 12, 2007

(86) PCT No.: PCT/JP2007/071947
§ 371 (c)(1),
(2), (4) Date: May 12, 2009

(87) PCT Pub. No.: WO2008/059805
PCT Pub. Date: May 22, 2008

(65) Prior Publication Data
US 2010/0061674 A1     Mar. 11, 2010

(30) Foreign Application Priority Data

Nov. 13, 2006 (JP) ................ P2006-306484
Nov. 13, 2006 (JP) ................ P2006-306485
Dec. 21, 2006 (JP) ................ P2006-343782

(51) Int. Cl.
*F16C 25/06* (2006.01)
(52) U.S. Cl. ......... 384/556; 384/557; 384/563; 384/571
(58) Field of Classification Search .............. 384/517, 384/563, 489, 493, 513, 557, 571; 74/409
See application file for complete search history.

(56) References Cited

U.S. PATENT DOCUMENTS

| 2,101,013 | A | * | 11/1937 | Leister et al. ............... 384/487 |
| 2,530,660 | A | * | 11/1950 | Hoeffleur .................... 384/508 |
| 4,023,868 | A | | 5/1977 | Miki |
| 4,400,098 | A | | 8/1983 | Lacey et al. |
| 4,696,587 | A | * | 9/1987 | Nishida et al. .............. 384/536 |
| 5,028,152 | A | | 7/1991 | Hill et al. |

(Continued)

FOREIGN PATENT DOCUMENTS

| EP | 1811176 A1 | 7/2007 |
| JP | 51-94046 | 8/1976 |

(Continued)

OTHER PUBLICATIONS

Japanese Office Action dated Sep. 20, 2011 (No. 639283) in JPA P2006-306484 with an English translation thereof.

(Continued)

*Primary Examiner* — William C Joyce
(74) *Attorney, Agent, or Firm* — McGinn IP Law Group, PLLC (57) ABSTRACT

A rolling bearing includes rolling elements, an inner ring which includes a raceway surface on which the rolling elements roll on an outer circumference thereof, and an outer ring which includes a raceway surface on which the rolling elements roll and which receives a radial load and a load directed to one side of an axial direction from the rolling elements on an inner circumference thereof. A closure member for closing an inner circumferential side opening of the outer ring is formed integrally at an end portion of the outer ring which lies on the one side of the axial direction or the outer ring is fitted in a cylindrical portion of the closure member.

3 Claims, 7 Drawing Sheets

U.S. PATENT DOCUMENTS

| | | | | |
|---|---|---|---|---|
| 5,051,005 | A | * 9/1991 | Duncan | 384/517 |
| 5,232,334 | A | * 8/1993 | Mechin et al. | 415/113 |
| 6,280,095 | B1 | * 8/2001 | Furukoshi et al. | 384/489 |
| 2006/0239598 | A1 | 10/2006 | Matsuyama et al. | |

FOREIGN PATENT DOCUMENTS

| | | | |
|---|---|---|---|
| JP | 55-47649 | | 12/1980 |
| JP | 58-221019 | * | 12/1983 |
| JP | 61-84225 U | | 6/1986 |
| JP | 5-99223 | | 4/1993 |
| JP | 10-225802 | | 8/1998 |
| JP | 2000-120669 A | | 4/2000 |
| JP | 2001-165179 A | | 6/2001 |
| JP | 2003-184873 | | 7/2003 |
| JP | 2004-176785 | * | 6/2004 |
| JP | 2005-54833 A | | 3/2005 |
| JP | 2005-282714 A | | 10/2005 |
| JP | 2005-344610 A | | 12/2005 |
| JP | 2006-153090 | | 6/2006 |
| JP | 2007-255681 | | 10/2007 |

OTHER PUBLICATIONS

Japanese Office Action dated Sep. 20, 2011 (No. 639284) in JPA P2006-306485 with an English translation thereof.
Notification of Reason for Refusal dated Feb. 2, 2012, in Japanese Patent Application No. 2006-306485 with English translation.
Notification of Reason for Refusal dated Feb. 2, 2012, in Japanese Patent Application No. 3006-306484 with English translation.
European Search Report dated Jun. 6, 2012.

* cited by examiner

ROLLING BEARING AND ROLLING BEARING APPARATUS

TECHNICAL FIELD

The present invention relates to a rolling bearing such as a tapered roller bearing, an angular contact ball bearing or the like which is used with a preload applied thereto.

BACKGROUND ART

Figure 7A:
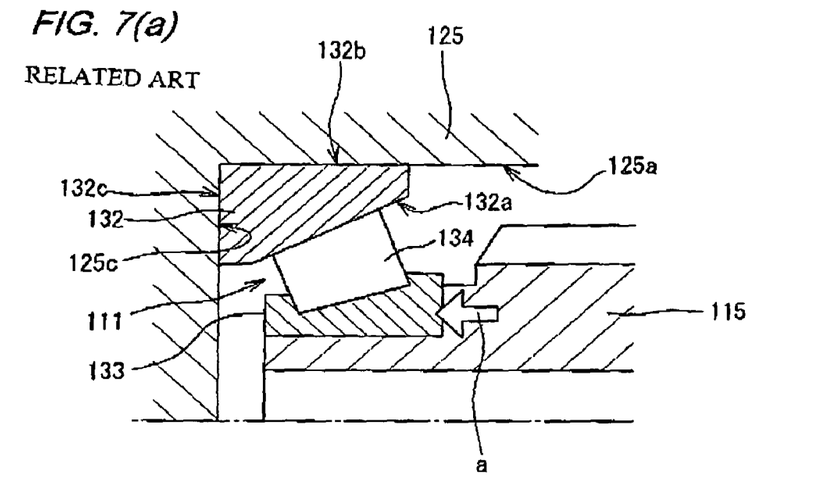
FIGS. 7(a) and 7(b) are enlarged sectional views showing a main part of a related-art rolling bearing apparatus.

A tapered roller bearing and an angular contact ball bearing are used in such a state that an axial preload is applied thereto. For example, in an automotive gear-type drive transfer unit such as a transmission, a tapered roller bearing is adopted in its main part (for example, a final drive portion in the transmission), and as is shown in FIG. 7(a), a rotational shaft 115 is press fitted in an inner ring 133 of a taper roller bearing 111, and an outer ring 132 is press fitted in a bearing housing 125 of a transmission case. Thereafter, a preload is made to be imparted towards one side (an arrow a) in an axial direction. When the preload is imparted, the outer ring 132 receives a component of force on an inclined rolling surface of a tapered roller 134 and is displaced in the axial direction and a radial direction, and its right end face 132c and outer circumferential surface 132b are pressed against an inner end face 125c and an inner circumferential surface 125a of the bearing housing 125, respectively, whereby the preload is supported.

On the other hand, in recent years, as part of the weight reduction, it is adopted that a transmission case (a bearing housing) is made of a light metal such as an Al alloy. In structural materials, Al has a highest linear thermal expansion coefficient (about $23.5 \times 10^{-6}/°C$. at room temperatures: hereinafter, the unit of linear thermal expansion coefficient will be expressed as ppm/°C. in an abbreviated shortened), and there is a considerable difference between the linear thermal expansion coefficient of Al and a linear thermal expansion coefficient (about 12 ppm/°C. at room temperatures) of a steel (an Fe-based material) which makes up a rotational shaft or a tapered roller bearing.

In a case where the rotational shaft and the bearing housing are made of the same material, since a change in dimension due to temperature thereof becomes the same, there is no large change in preload which is applied to the tapered roller bearing. However, in the event that the bearing housing is made of a light metal, the bearing housing changes in dimension larger than the rotational shaft as the temperature of the transmission increases, and this may cause a fear that the preload is lost.

Figure 7B:
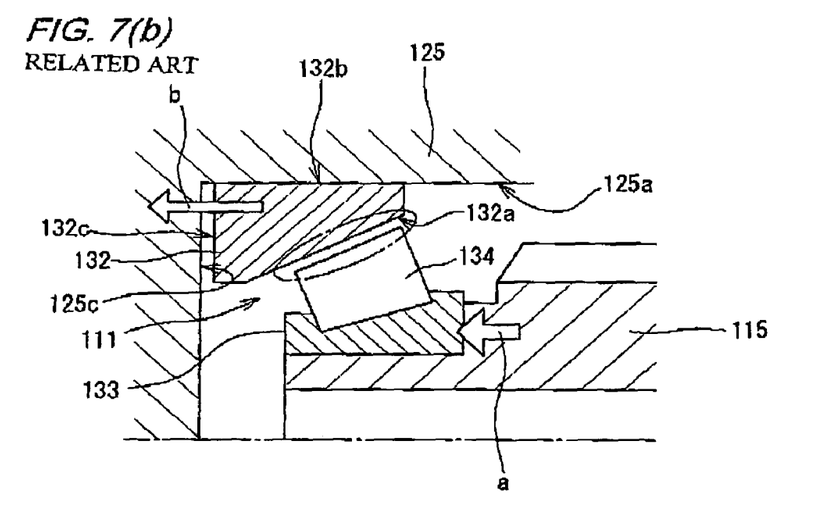

Specifically, as is shown in FIG. 7(b), when the temperature of the transmission increases, although the bearing housing 125 and the rotational shaft 115 expand, an inner circumferential raceway surface 132a of the outer ring 132 is separated from the rolling surface of the tapered roller 134 in a direction indicated by an arrow b due to a difference in dimension change caused by the expansion. Namely, an axial space and a radial space of the tapered roller bearing 111 change largely due to the increased temperature, and the preload becomes insufficient. Such an insufficient preload calls for looseness in the gears and becomes a cause for generation of noise.

As a means for solving the problem above, Patent Document 1 below discloses a rolling bearing apparatus in which a preload is imparted to an outer ring by hydraulic pressure or a spring. Specifically, a bottomed cylindrical cylinder is formed in a bearing housing, and an outer ring is fitted in this cylinder so as to slide in an axial direction, while a disk-shaped preload member is provided so as to be brought into abutment with an axial outer end portion of the outer ring, so that oil is supplied into an oil pressure chamber which is surrounded by a cylinder inner surface and the preload member by a hydraulic pump. Further, a compression coil spring is provided within the oil pressure chamber so as to bias the preload member inwards in the axial direction.

In this configuration, while the preload is imparted to the preload member by the oil pressure and the compression coil spring, when the bearing housing changes in dimensions larger than the bearing housing and a rotational shaft due to an increase in temperature, the outer ring can be moved inwards in the axial direction via the preload member by the functions of the compression coil spring and the oil pressure, so as to suppress a change in axial space and radial space of the tapered roller bearing to thereby solve the problem of the insufficient preload.

Patent Document 1: JP-A-2006-153090

DISCLOSURE OF THE INVENTION

Problem that the Invention is to Solve

In the technique disclosed in Patent Document 1, however, since the outer ring and the preload member are separate, when the inner circumferential surface of the bearing housing expands diametrically due to thermal expansion, the outer ring and the preload member are inclined independently, leading to a possibility that the relative positions of both the constituent members are offset. When the outer ring and the preload member rub against each other due to the offset in the relative positions, wear is produced, which causes a reduction in durability or causes dust of the material of the outer ring and the preload member produced from the wear to bite into a contact portion between rolling elements and the inner ring and the outer ring.

In addition, when the bearing housing expands radially due to an increase in temperature thereof to thereby cause a difference in radial dimension change between the preload member and the outer ring, there will be a possibility that oil leaks from a gap between both the constituent members, whereby a sufficient preload cannot be imparted. In particular, in the technique disclosed in Patent Document 1, although one O-ring is interposed between an outer circumferential surface of the preload member and an inner circumferential surface of the bearing housing (the cylinder), oil is permitted to pass through the O-ring in order to prevent an increase in pressure within the oil pressure chamber when the bearing housing is cooled from the heated state, and hence, the oil leakage cannot be prevented perfectly.

In addition, when axial impact load is applied to the tapered roller bearing from the rotational shaft, there may be a case where the pressure in the oil pressure chamber increases excessively, whereby oil passes between the bearing housing and the preload member and the outer ring to leak, leading to a problem that the oil consumption amount is increased.

The invention has been made in view of these situations, and an object thereof is to provide a rolling bearing and a rolling bearing apparatus which can prevent the occurrence of wear in association with an offset in relative position between a closure member (the preload member) to which a fluid pressure such as an oil pressure is applied and an outer ring. Further, another object of the invention is to provide a rolling bearing and a rolling bearing apparatus which can prevent an oil leakage from a space between a bearing housing and an outer ring of the rolling bearing to maintain a preload appropriately in imparting the preload to the rolling bearing by the use of the fluid pressure such as the oil pressure.

Means for Solving the Problem

A rolling bearing according to the invention comprises rolling elements, an inner ring which includes a raceway surface on which the rolling elements roll on an outer circumference thereof and an outer ring which includes a raceway surface on which the rolling elements roll and which receives a radial load and a load directed to one side of an axial direction from the rolling elements on an inner circumference thereof, wherein a closure member for closing an inner circumferential side opening of the outer ring is formed integrally at an end portion of the outer ring which lies on the one side of the axial direction or the outer ring is fitted in a cylindrical portion of the closure member.

In a case where this rolling bearing is incorporated in a transmission or the like, the outer ring or the cylindrical portion of the closure member is incorporated in an inner circumferential surface of a bearing housing, a rotational shaft is fitted in an inner circumferential surface of the inner ring, and as a preload, a fluid pressure such as an oil pressure is imparted to the closure member from the other side of the axial direction. By this, even though the inner circumferential surface of the bearing housing expands diametrically due to an increase in temperature, producing a space between an outer circumferential surface of the outer ring or the closure member and the inner circumferential surface of the bearing housing, the outer ring and the closure members are inclined independently in no case, and neither an offset in relative position between the outer ring and the closure member nor wear associated with the positional offset is produced.

A plurality of O-ring mounting circumferential grooves are preferably formed on an outer circumferential surface of the outer ring so as to be spaced apart in the axial direction. As this occurs, by mounting O-rings in the circumferential grooves and bringing the O-rings into press contact with the inner circumferential surface of the bearing housing, not only can the leakage of fluid pressure be prevented, but also the refilling of fluid pressure can be reduced. In addition, since the outer ring is supported by the O-rings at a plurality of locations in the axial direction, the inclination of the outer ring can be prevented.

A seal member is preferably provided on the outer circumferential surface of the outer ring, the seal member having a lip portion which projects radially outwards and to the one side of the axial direction.

In a case where this rolling bearing is incorporated in a transmission or the like, the outer ring is incorporated in the inner circumferential surface of the bearing housing and the lip portion of the seal member is brought into abutment with the inner circumferential surface, the rotational shaft is fitted in an inner circumferential surface of the inner ring, and as a preload, a fluid pressure such as an oil pressure is imparted to the closure member from the other side of the axial direction. By this, even though the inner circumferential surface of the bearing housing expands diametrically due to an increase in temperature, producing a space between the outer circumferential surface of the outer ring and the inner circumferential surface of the bearing housing, the oil leakage from the space can be prevented further by the seal member, whereby not only can the preload be maintained appropriately, but also the refilling of fluid pressure can be reduced. In addition, even though the fluid pressure increases momentarily due to the transmission of impact load from the rotational shaft, the oil leakage from the space can be prevented by the seal member.

A rolling bearing apparatus according to the invention comprises:

the bearing in which the outer ring has a first linear thermal expansion coefficient;

a bearing housing which includes an inner circumferential surface in which an outer circumferential surface of the outer ring fits and which has a second linear thermal expansion coefficient which is larger than the first linear thermal expansion coefficient;

a rotational shaft which fits in the inner circumferential surface of the inner ring and which has a third linear thermal expansion coefficient which is smaller than the second linear thermal expansion coefficient; and a preload imparting mechanism for imparting a preload directed to the other side of the axial direction to the outer ring by a fluid pressure, wherein a closure member which closes an inner circumferential side opening of the outer ring and to which the fluid pressure by the preload imparting mechanism is applied is formed integrally at an end portion of the outer ring which lies on the one side of the axial direction.

According to this, even though the inner circumferential surface of the bearing housing expands diametrically due to an increase in temperature and a space is produced between the outer circumferential surfaces of the outer ring and the closure member and the inner circumferential surface of the bearing housing, there is no such case that the outer ring and the closure member are inclined independently, and neither an offset in relative position between the outer ring and the closure member nor wear associated with the positional offset is generated.

A plurality of O-ring mounting circumferential grooves are preferably formed on the outer circumferential surface of the outer ring so as to be spaced apart in the axial direction, and O-rings mounted in the circumferential grooves are preferably brought into press contact with the inner circumferential surface of the bearing housing. As these occur, not only can the leakage of a fluid which imparts a pressure to the closure member be prevented by the O-rings, but also the refilling of fluid pressure can be reduced. In addition, since the outer ring is supported at a plurality of locations in the axial direction by the O-rings, the inclination of the outer ring can be prevented.

Further, the rolling bearing apparatus according to the invention includes preferably a seal member having a lip portion which projects radially outwards and to the one side of the axial direction from the outer circumferential surface of the outer ring, and the lip portion is preferably brought into abutment with the inner circumferential surface of the bearing housing in which the outer circumferential surface of the outer ring fits.

According to this, even though the inner circumferential surface of the bearing housing expands diametrically due to an increase in temperature and a space is produced between the outer circumferential surfaces of the outer ring and the inner circumferential surface of the bearing housing, the oil leakage from the space can be prevented by the seal member, whereby not only can the preload be maintained appropriately, but also the refilling of fluid pressure can be reduced. In addition, even though the fluid pressure increases momentarily due to the transmission of impact load from the rotational shaft, the oil leakage from the space can be prevented by the seal member.

According to another aspect of the invention, a rolling bearing apparatus comprises:

the bearing in which the outer ring has a first linear thermal expansion coefficient;

a preload member which includes a cylindrical portion in which an outer circumferential surface of the outer ring fits and a closure portion which closes an inner circumferential side opening of the outer ring which lies on the one side of the axial direction and which has a second linear thermal expansion coefficient;

a bearing housing which includes an inner circumferential surface in which the cylindrical portion of the preload member fits and which has a third linear thermal expansion coefficient which is larger than the first and second linear thermal expansion coefficients;

a rotational shaft which fits in an inner circumferential surface of the inner ring and which has a fourth linear thermal expansion coefficient which is smaller than the third linear thermal expansion coefficient; and a preload imparting mechanism which imparts a preload directed to the other side of the axial direction to the closure portion.

According to this, since the outer ring is fitted in the cylindrical portion of the preload member to which a preload is imparted by the fluid pressure, even though the inner circumferential surface of the bearing housing expands diametrically due to an increase in temperature and a space is produced between an outer circumferential surface of the cylindrical portion and the inner circumferential surface of the bearing housing, there is no such case that the outer ring and the preload member are inclined independently, and neither an offset in relative position between the outer ring and the preload member nor wear associated with the positional offset is generated.

The preload member preferably confronts an end face of the bearing housing which lies on the other side of the axial direction and includes a flange portion which can be brought into abutment with the end face. According to this, in a case where impact load directed to the one side of the axial direction is applied to the preload member from the rotational shaft, the flange portion can receive the impact load by being brought into abutment with the end face of the bearing housing, thereby making it possible to prevent the fluid pressure that is applied to the preload member from being increased excessively. Consequently, the leakage of fluid attributed to the increase in fluid pressure can be prevented, thereby making it possible to reduce the consumption amount of fluid.

Advantage of the Invention

According to the invention, the generation of wear can be prevented which is associated with the offset in relative position between the closure member (the preload member) to which the fluid pressure such as the oil pressure is applied and the outer ring.

Further, in imparting a preload to the rolling bearing by the use of a fluid pressure such as an oil pressure, the leakage of fluid from the space between the bearing housing and the outer ring of the rolling bearing can be prevented, so as to maintain the preload appropriately.

BEST MODE FOR CARRYING OUT THE INVENTION

Figure 1:
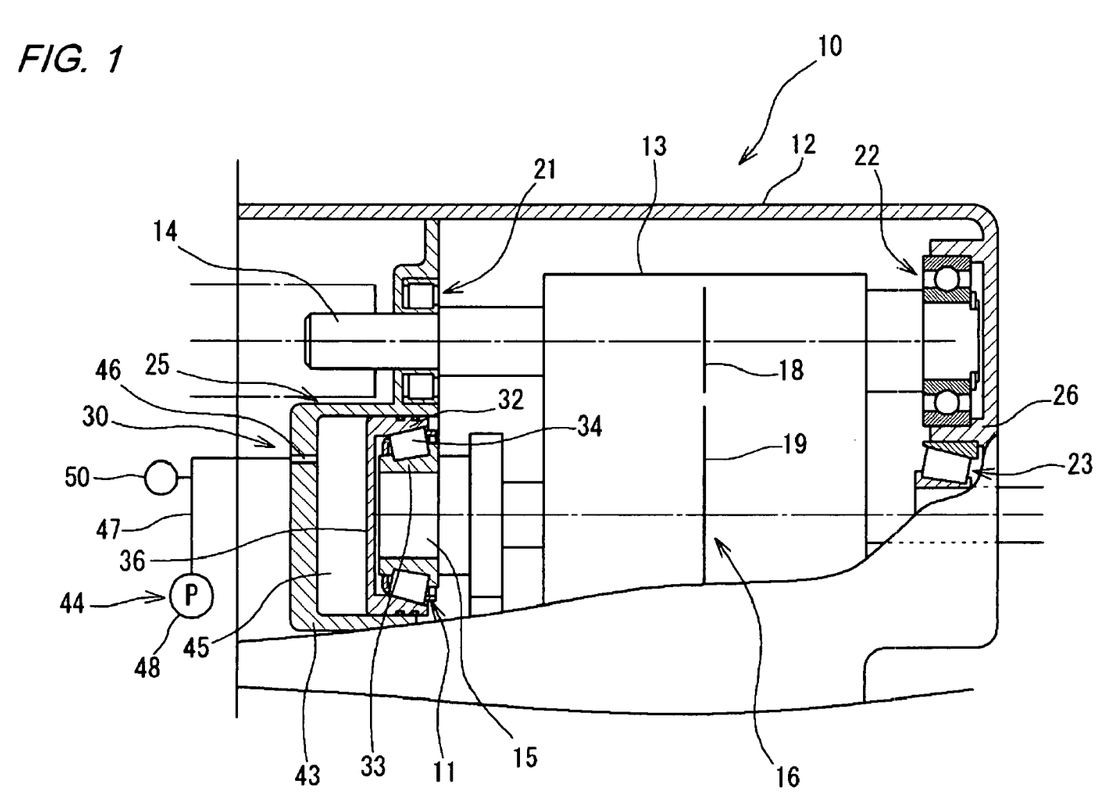
FIG. 1 is a sectional view showing a transmission which is a rolling bearing apparatus according to an embodiment of the invention.

FIG. 1 is a side sectional view showing a rolling bearing apparatus according to a first embodiment of the invention. This rolling bearing apparatus is configured by incorporating a rolling bearing 11 in a transmission 10. The transmission 10 includes a case 12, a gear box 13 which is incorporated in an interior of the case 12, an input shaft 14 and an output shaft (a rotational shaft) 15, the input shaft 14 and the output shaft 15 being provided parallel to each other so as to penetrate through the gear box 13. The input shaft 14 and the output shaft 15 are linked with each other so as to rotate via a change-speed gear 16 within the bear box 13.

The change-speed gear 16 is of a manual type, for example, and a plurality of input gears 18 whose numbers of teeth are different from each other are provided on the input shaft 14, while a plurality of output gears 19 whose numbers of teeth are different from each other are provided on the output shaft 15, whereby gear ratios of the change-speed gear 16 can be changed by switching combinations of the gears 18 on the input shaft 14 and the gears 19 on the output shaft 15 which mesh with each other in accordance with a transmission gear ratio to be obtained or a selection between a forward gear and a reverse gear. These input gears 18 and output gears 19 adopt spur gears and helical gears. In addition, the change-speed gear 16 may be of an automatic type which employs a planetary gear mechanism or the like.

Both ends of the input shaft 14 are supported rotatably by a cylindrical roller bearing 21 and a ball bearing 22, respectively, which are fixed to an inside of the case 12. Both ends of the output shaft 15 are supported by tapered roller bearings 11, 23, respectively. The tapered roller bearing 11 on one side (a left-hand side) of an axial direction is fitted in a bearing housing 25 which is integral with the case 12, and the tapered roller bearing (the second tapered roller bearing) 23 on the other side (a right-hand side) of the axial direction is fixed to a bearing housing 26 which is integral with the case 12 so as to be brought into abutment therewith. In addition, a preload directed inwards (rightwards) in the axial direction is applied to the left-hand side tapered roller bearing 11 from a preload imparting mechanism 30. This preload imparting mechanism 30 will be described in detail later.

Figure 2:
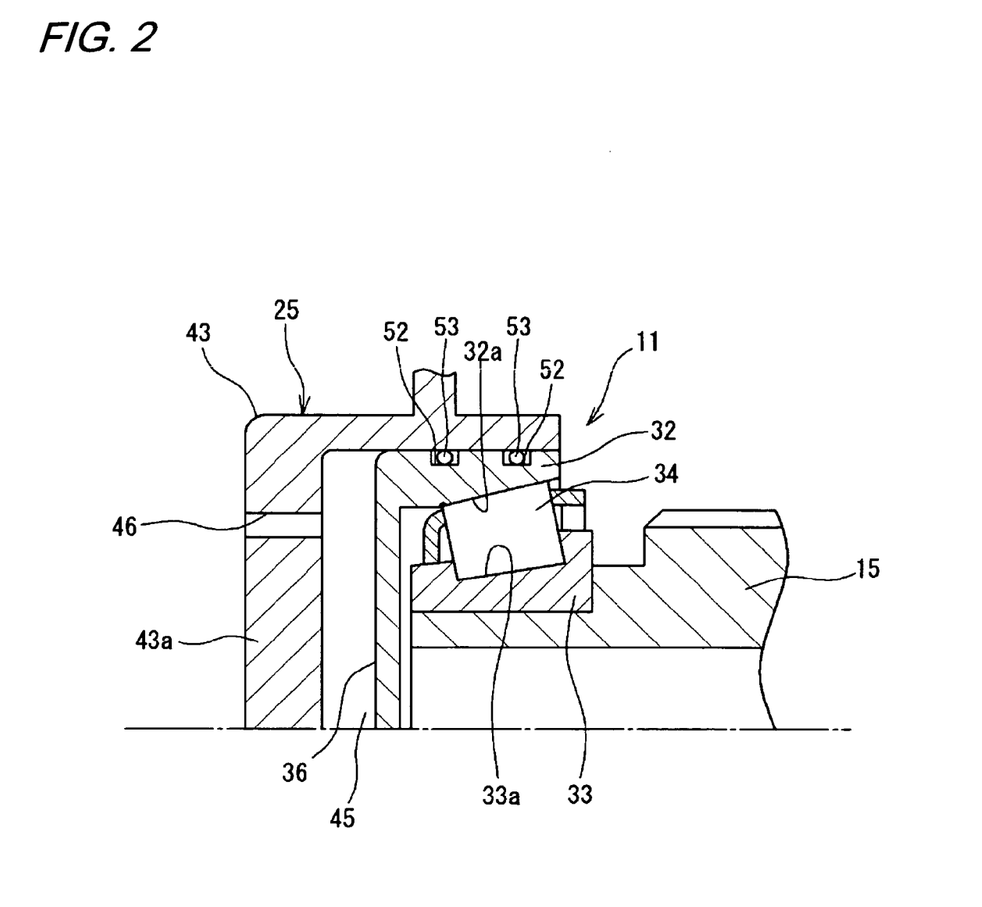
FIG. 2 is an enlarged sectional view of a main part of the rolling bearing apparatus.

FIG. 2 is a sectional view showing a main part of the invention in an enlarged fashion. The left-hand side tapered roller bearing 11 includes an outer ring 32, an inner ring 33 and a plurality of tapered rollers (rolling elements) 34 which are disposed between the outer ring 32 and the inner ring 33. An outer circumferential surface of the outer ring 32 is fitted in an inner circumferential surface of the bearing housing 25, and an inner circumferential raceway surface 32a is formed on an inner circumferential surface of the outer ring 32 in such a manner that the tapered rollers 34 roll thereon while in contact therewith in an inclined fashion. An outer circumferential raceway surface 33a is formed on an outer circumferential surface of the inner ring 33 in such a manner that the tapered rollers 34 roll thereon while in contact therewith in an inclined fashion, and the output shaft 15 is fitted in an inner circumferential surface of the inner ring 33. A contact angle between the inner ring 33 and the tapered roller 34 and a contact angle between the tapered roller 34 and the outer ring 32 are set so as to increase diametrically from an axial inside (a right-hand side) towards an axial outside (a left-hand side). In addition, here, the contact angle conforms to a nominal contact angle specified under JIS B 0104-1991.

These configurations are true with the right-hand side tapered roller bearing 23 (FIG. 1) except that an axial inside is referred to as a left-hand side, and an axial outside is referred to as a right-hand side.

Further, a closure member (a preload member) 36 is provided on the outer ring 32 of the left-hand side tapered roller bearing 11. This closure member 36 is formed integrally with the outer ring 32 at an axially outer end portion (a left end portion) of the outer ring 32 so as to close an inner circumferential side opening of the outer ring 32. Consequently, the outer ring 32 has a configuration in which it is constructed to be solid at the axially outer end portion and is opened only at an axially inner end portion.

In addition, a plurality of (two in the example shown in the drawings) circumferential grooves 52 are formed on the outer circumferential surface of the outer ring 32 so as to be spaced apart in an axial direction. An O-ring 53, which is made of a reinforced rubber, is fitted in each circumferential groove 52, and the O-ring 53 is brought into press contact with the inner circumferential surface of the bearing housing 25 to thereby be deformed elastically. As the material of the rubber used for the O-ring 53, in consideration of the contact with an oil in the preload imparting mechanism 30, rubbers which can satisfy both mechanical strength and resistance to oil are preferred, and they include, for example, nitril rubber (in particular, hydrogenated nitril rubber), acrylic rubber, silicone rubber and fluorocarbon rubber.

The outer ring 32 of the tapered roller bearing 11 has a first linear thermal expansion coefficient. In contrast to this, the bearing housing 25 has a second linear thermal expansion coefficient which is larger than the first linear thermal expansion coefficient. In addition, the output shaft 15 has a third linear thermal expansion coefficient which is smaller than the second linear thermal expansion coefficient.

For example, in the tapered roller bearing 11, the outer ring 32, the inner ring 33 and the roller elements 34 are all formed of a steel (for example, a bearing steel, a case hardening steel, a carburizing steel), the bearing housing 25 is formed of a light metal (a metal in which either Al or Mg configures a main constituent (the content is 50% by mass or more), and the output shaft 15 is formed of a steel (for example, a machine construction low alloy steel). Preferably, Al or an Al alloy is used for the bearing housing 25 from the viewpoint of workability and resistance to corrosion, and as the Al alloy, for example, an Al alloy for die casting is used. In this embodiment, the case 12 (FIG. 1) is also made of the Al alloy, and the bearing housing 25 is integrated with an inner surface of the case 12.

The linear thermal expansion coefficient of Al which configures the main constituent of the bearing housing 25 (the second linear thermal expansion coefficient) is 23 to 24 ppm/° C., and the linear thermal expansion coefficient of Fe which configures the main constituents of the output shaft 15 and the tapered roller bearing 11 (the first and third linear thermal expansion coefficients) is about 12 to 13 ppm/° C. In addition, in general, a bearing utilization environmental temperature in a transmission is in the range of −40° C. or higher to 150° C. or lower (a normal ultimate temperature excluding cold regions and continuous driving at high speeds is 50° C. or higher and 80° C. or lower).

As is shown in FIG. 1, the preload imparting mechanism 30 is such as to impart an axially inward preload to the tapered roller bearing 11 and includes a bottomed cylindrical cylinder 43 which is provided in the bearing housing 25 and a pressure supply unit 44 which is connected to the cylinder 43 for supplying an oil pressure (a fluid pressure) to an interior of the cylinder 43. The outer ring 32 is fitted in the cylinder 43 so as to slide in the axial direction, and a space defined between an inner circumferential surface of the cylinder 43 and the closure member 36 is made to configure an oil pressure chamber 45 (a fluid pressure chamber). A solid lubricant is coated on the outer circumferential surface of the outer ring 32 in order to provide a smooth sliding. As the solid lubricant, it is possible to use, for example, a fluorocarbon resin such as polytetrafluoroethylene, molybdenum disulfide, graphite, molybdenum and resins in which they are dispersed. The pressure supply unit 44 includes an oil line (a flow path) 47 which is connected to the oil pressure chamber 45 via a through hole 46 which is formed in a bottom wall of the cylinder 43 and a hydraulic pump 48 for causing an oil to flow along the oil line 47.

When oil is supplied to the oil pressure chamber 45 via the oil line 47 and the through hole 46 by the operation of the hydraulic pump 48, an axially inward (rightward) preload is imparted to the outer ring 32. The outer ring 32 receives a component of force from the inclined rolling surfaces of the tapered rollers 34 to thereby be displaced axially and radially, and a radial preload is supported by the outer circumferential force of the outer ring 32 being pressed against an inner circumferential surface of the cylinder 43. The preload applied to the outer ring 32 is made to be adjusted in accordance with a pressure under which oil is sent by the hydraulic pump 48.

In addition, the preload imparting mechanism 30 also includes a pressure discharging unit 50. This pressure discharging unit 50 is such as to discharge oil in the oil pressure chamber 45 so as to release the preload when the pressure inside the oil pressure chamber 45 is increased to thereby produce an excessive preload in the tapered roller bearing 11. The oil so discharged is made to flow into an oil pressure tank for the hydraulic pump or a discharge container. In addition, in the event that the oil used is the same as a lubricant for the transmission 10, the oil may be discharged into the transmission 10 by the pressure discharging unit 50.

As this pressure discharging unit 50, for example, an opening and closing valve such as a solenoid valve or a relief valve or a differential pressure holding unit such as an orifice or a needle is used. In the case of a solenoid valve being used, a pressure sensor is provided for monitoring an internal pressure of the pressure supply unit 44 (an internal pressure of the oil pressure chamber 45 or the through hole 46, a pressure under which oil is sent by the hydraulic pump 48). When the internal pressure is increased excessively, by opening the solenoid valve provided in the oil line 47, the oil is discharged, so as to make proper the internal pressure. In the case of a relief valve being used, a pressure is set in advance so that the relief valve is opened to discharge the oil when the internal pressure in the oil pressure chamber 45 exceeds a certain pressure. In the case of an orifice or a needle being used, they are set to obtain a proper internal pressure.

In the case of a check valve being provided in the oil line 47 or the through hole 46 so as to prevent the oil from flowing in a reverse direction from the oil pressure chamber 45 to the hydraulic pump 48 side, a separate oil line may be connected to the oil pressure chamber 45, while the solenoid valve or the relief valve is provided, so that when the pressure inside the oil pressure chamber 45 exceeds a predetermined pressure, the solenoid valve or the relief valve is opened so as to discharge the oil from the separate oil line.

The operation of the rolling bearing apparatus according to the first embodiment will be described.

As has been described, the axial preload is imparted to the outer ring 32 of the tapered roller bearing 11 by supplying the oil pressure from the hydraulic pump 48 to the oil pressure chamber 45, and the outer circumferential surface of the outer ring 32 is pressed against the inner circumferential surface of the bearing housing 25 (the cylinder 43) to thereby be supported thereon.

The closure member 36 is provided on the outer ring 32, and since the closure member 36 enables the oil pressure to be received by a wide area, a large magnitude of force can be made to act on the outer ring 32 even with a small magnitude of oil pressure. Consequently, a hydraulic pump with a small capacity can be used as the hydraulic pump 48, thereby making it possible to realize a reduction in size and production cost of the preload imparting mechanism 30.

When the temperature of the transmission 10 is maintained constant at a relatively low temperature, there is caused almost no difference in dimension change due to thermal expansion of the bearing housing 25, the outer ring 32 and the output shaft 15, and the preload is maintained constant.

When the temperature of the transmission 10 is increased, since the linear thermal expansion coefficient of the transmission 10 and the bearing housings 25, 26 is larger than the linear thermal expansion coefficient of the output shaft 15, the transmission 10 and the bearing housings 25, 26 expand largely in the axial direction, whereby the outer ring 32 attempts to move away from the tapered rollers 34.

In addition, since the linear thermal expansion coefficient of the bearing housing 25 is larger than the linear thermal expansion coefficient of the tapered roller bearing 11, the inner circumferential surface of the bearing housing 25 (the cylinder 43) expands diametrically to thereby attempt to move away from the outer circumferential surface of the outer ring 32. Namely, the supporting position of the outer circumferential surface of the outer ring 32 by the inner circumferential surface of the bearing housing 25 changes radially outwards, whereby the reaction force to the outer ring 32 by the bearing housing 25 is reduced.

As this occurs, the outer ring 32 is pressed axially inwards (rightwards) by the oil pressure from the hydraulic pump 48 and moves to a position where the preload imparted to the outer ring 32 is balanced with the reaction force from the bearing housing 25. As a result, even though the supporting position of the outer circumferential surface of the outer ring 32 is moved by the increase in temperature, the preload against the outer ring 32 is maintained almost constant.

In addition, as is shown in FIG. 2, when the inner circumferential surface of the bearing housing 25 expands diametrically to thereby move away from the outer circumferential surface of the outer ring 32, following the inner circumferential surface of the bearing housing 25, the O-rings 53 provided on the outer ring 32 are restored elastically so as to maintain the state in which the O-rings 53 are in press contact with (are closely attached to) the inner circumferential surface of the bearing housing 25. In addition, since the O-rings are made of rubber and have the liner thermal expansion coefficient (the fourth linear thermal expansion coefficient) which is larger than the linear thermal expansion coefficient of the bearing housing 25, the O-rings expand larger than the bearing housing 25 so as to be closely attached to the inner circumferential surface of the bearing housing 25 when the temperature thereof is increased. Consequently, oil is prevented from leaking from a space that would otherwise be produced between the inner circumferential surface of the bearing housing 25 and the outer circumferential surface of the outer ring 32, thereby making it possible to maintain the preload. Further, since the plurality of O-rings 53 are provided so as to be spaced apart in the axial direction, not only can the oil leakage be prevented in a more ensured fashion, but also the operation of the hydraulic pump 48 can be suppressed to thereby realize the saving of energy.

In addition, by the closure member 36 being provided integrally with the outer ring 32, the rigidity of the outer ring 32 is enhanced, whereby even in the event that a space is produced between the inner circumferential surface of the bearing housing 25 and the outer circumferential surface of the outer ring 32 in association with an increase in the temperature of the transmission 10, the deterioration in roundness of the raceway can be suppressed, so as to maintain the performance of the bearing.

In the event that the outer ring 32 and the closure member 36 are formed separate as in the related-art, when the inner circumferential surface of the bearing housing 25 expands diametrically, the outer ring 32 and the closure member 36 tend to be easily inclined individually, whereby the outer ring 32 and the closure member 36 are offset from their normal positions, leading to a fear that they are caused to rub against each other to generate wear thereof. However, by the outer ring 32 and the closure member 36 being formed integrally with each other, the aforesaid defective can be prevented from being caused. In addition, since the plurality of O-rings 53 are provided so as to be spaced apart in the axial direction, the inclination of the outer ring 32 itself can be suppressed.

When the temperature of the transmission 10 decreases, the bearing housing 25 thermally shrinks axially and radially, and the oil pressure chamber 45 is reduced in size. By this, the oil within the oil pressure chamber 45 is pressurized, and an excessive preload is caused to act on the tapered roller bearing 11. As this occurs, as is shown in FIG. 1, the pressure discharging unit 50 is allowed to function to discharge the oil from the oil pressure chamber 45 to thereby maintain proper the pressure in the oil pressure chamber 45.

In addition, also when impact load is applied to the output shaft 15 in a reverse direction to the direction in which the preload is imparted (axially outwards) due to changing the gear ratios of the transmission 10 or engaging or disengaging a clutch (whose illustration is omitted), the outer ring 32 moves in the axial direction against the oil pressure by the hydraulic pump 48 via the inner ring 33 and the tapered rollers 34, whereby an excessive preload is caused to act on the tapered roller bearing 11. However, in this case, too, the pressure discharging unit 50 is allowed to function to discharge the oil within the oil pressure chamber 45, so as to maintain proper the pressure in the oil pressure chamber 45.

In addition, even though the pressure in the oil pressure chamber 45 is increased momentarily by the application of the impact load, since the plurality of O-rings 53 are provided on the outer ring 32, the oil leakage from a space can be prevented which would otherwise be produced between the inner circumferential surface of the bearing housing 25 and the outer circumferential surface of the outer ring 32.

Figure 3:
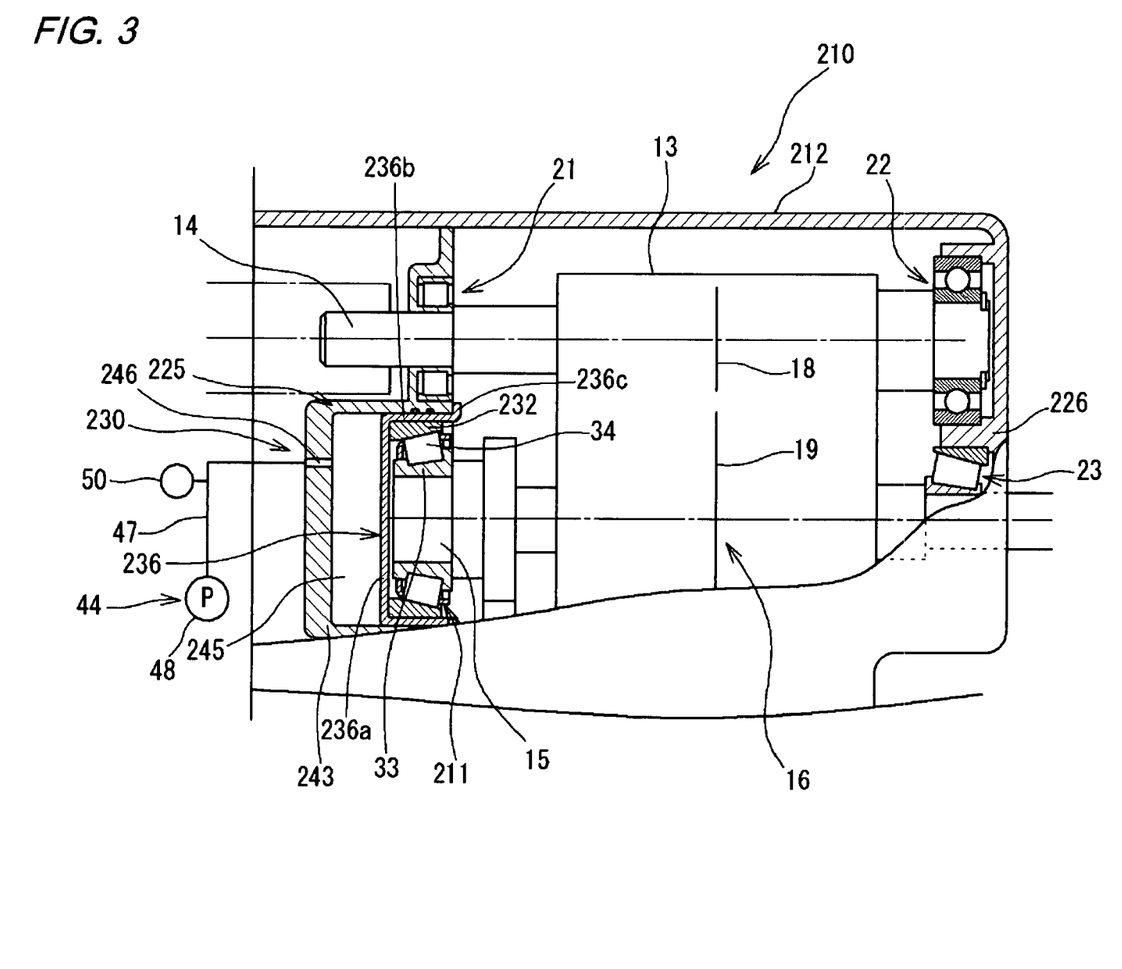
FIG. 3 is a sectional view showing a transmission which is a rolling bearing apparatus according to an embodiment of the invention.

FIG. 3 is a side sectional view showing a rolling bearing apparatus according to a second embodiment of the invention. This rolling bearing apparatus is configured by incorporating a rolling bearing 211 in a transmission 210. The transmission 210 includes a case 212, a gear box 13 which is incorporated in an interior of the case 212, an input shaft 14 and an output shaft (a rotational shaft) 15, the input shaft 14 and the output shaft 15 being provided parallel to each other so as to penetrate through the gear box 13. The input shaft 14 and the output shaft 15 are linked with each other so as to rotate via a change-speed gear 16 within the bear box 13.

The change-speed gear 16 is of a manual type, for example, and a plurality of input gears 18 whose numbers of teeth are different from each other are provided on the input shaft 14, while a plurality of output gears 19 whose numbers of teeth are different from each other are provided on the output shaft 15, whereby gear ratios of the change-speed gear 16 can be changed by switching combinations of the gears 18 on the input shaft 14 and the gears 19 on the output shaft 15 which mesh with each other in accordance with a transmission gear ratio to be obtained or a selection between a forward gear and a reverse gear. These input gears 18 and output gears 19 adopt spur gears and helical gears. In addition, the change-speed gear 16 may be of an automatic type which employs a planetary gear mechanism or the like.

Both ends of the input shaft 14 are supported rotatably by a cylindrical roller bearing 21 and a ball bearing 22, respectively, which are fixed to an inside of the case 212. Both ends of the output shaft 15 are supported by tapered roller bearings 211, 23, respectively. The tapered roller bearing 211 on one side (a left-hand side) of an axial direction is fitted in a bearing housing 225 which is integral with the case 212, and the tapered roller bearing 23 on the other side (a right-hand side) of the axial direction is fixed to a bearing housing 226 which is integral with the case 212 so as to be brought into abutment therewith. In addition, a preload directed inwards (rightwards) in the axial direction is applied to the left-hand side tapered roller bearing 211 from a preload imparting mechanism 230. This preload imparting mechanism 230 will be described in detail later.

Figure 4:
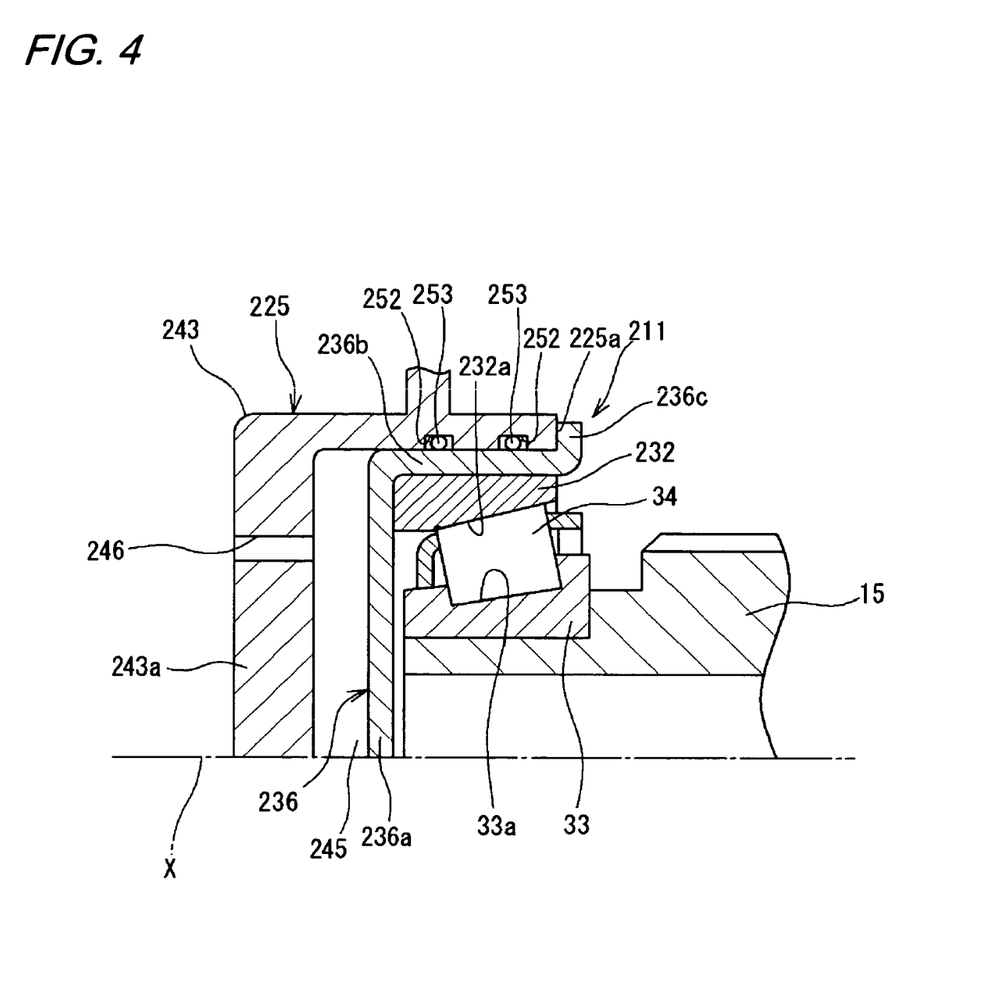
FIG. 4 is an enlarged sectional view of a main part of the rolling bearing apparatus.

FIG. 4 is a sectional view showing a main part of the invention in an enlarged fashion. The left-hand side tapered roller bearing 211 includes an outer ring 232, an inner ring 33 and a plurality of tapered rollers (rolling elements) 34 which are disposed between the outer ring 232 and the inner ring 33. An outer circumferential surface of the outer ring 232 is fitted in an inner circumferential surface of a preload member 236, and an inner circumferential raceway surface 232a is formed on an inner circumferential surface of the outer ring 232 in such a manner that the tapered rollers 34 roll thereon while in contact therewith in an inclined fashion. An outer circumferential raceway surface 33a is formed on an outer circumferential surface of the inner ring 33 in such a manner that the tapered rollers 34 roll thereon while in contact therewith in an inclined fashion, and the output shaft 15 is fitted in an inner circumferential surface of the inner ring 33. A contact angle between the inner ring 33 and the tapered roller 34 and a contact angle between the tapered roller 34 and the outer ring 232 are set so as to increase diametrically from an axial inside (a right-hand side) towards an axial outside (a left-hand side). In addition, here, the contact angle conforms to a nominal contact angle specified under JISB 0104-1991.

These configurations are true with the right-hand side tapered roller bearing 23 (FIG. 3) except that an axial inside is referred to as a left-hand side and an axial outside is referred to as a right-hand side and that the outer ring is fitted directly in the bearing housing 26.

In the second embodiment, the preload member 236 has a cylindrical portion 236b in which the outer ring 232 of the left-hand side tapered roller bearing 211 fits, a closure portion 236a which is provided at an axially outer end portion (a left end portion) of the cylindrical portion 236b and a flange portion 236c which is provided at an axially inner end portion (a right end portion) of the cylindrical portion 236b, and these cylindrical portion 236b, the closure portion 236a and the flange portion 236c are formed integrally by pressing, for example, a sheet metal material.

The cylindrical portion 236b extends in an axis center X direction of the rotational shaft 15 and is fitted slidably in an inner circumferential surface of the bearing housing 225. The closure portion 236a is formed into a disk shape and is disposed so as to close entirely an inner circumferential side opening at an axially outer end portion (a left end portion) of the outer ring 232. The flange portion 236c is formed into an annular shape so as to project radially outwards from the cylindrical portion 236b and confronts an axially inner end face 225a of the bearing housing 225. In addition, the preload member 236 is restricted from moving axially outwards (rightwards) in a predetermined way by the flange portion 236c being brought into abutment with the end face 225a of the rearing housing 225.

A plurality of (two in the example shown in the drawings) circumferential grooves 252 are formed on the inner circumferential surface of the bearing housing 225 so as to be spaced apart in an axial direction. An O-ring 253, which is made of a reinforced rubber, is fitted in each circumferential groove 252, and the O-ring 253 is brought into press contact with an outer circumferential surface of the cylindrical portion 236b of the preload member 236 to thereby be deformed elastically. As the material of the rubber used for the O-ring 253, in consideration of the contact with an oil in the preload imparting mechanism 230, rubbers which can satisfy both mechanical strength and resistance to oil are preferred, and they include, for example, nitril rubber (in particular, hydrogenated nitril rubber), acrylic rubber, silicone rubber and fluorocarbon rubber.

The outer ring 232 of the tapered roller bearing 211 has a first linear thermal expansion coefficient and the preload member 236 has a second linear thermal expansion coefficient. In contrast to this, the bearing housing 225 has a third linear thermal expansion coefficient which is larger than the first and second linear thermal expansion coefficients. In addition, the output shaft 15 has a fourth linear thermal expansion coefficient which is smaller than the third linear thermal expansion coefficient.

For example, in the tapered roller bearing 211, the outer ring 232, the inner ring 33 and the roller elements 34 are all formed of a steel (for example, a bearing steel, a case hardening steel, a carburizing steel), and the preload member 236 is also formed of a steel. The bearing housing 225 is formed, for example, of a light metal (a metal in which either Al or Mg configures a main constituent (the content is 50% by mass or more), and the output shaft 15 is formed of a steel (for example, a machine construction low alloy steel).

Preferably, Al or an Al alloy is used for the bearing housing 225 from the viewpoint of workability and resistance to corrosion, and as the Al alloy, for example, an Al alloy for die casting is used. In this embodiment, the case 212 (FIG. 3) is also made of the Al alloy, and the bearing housing 225 is integrated with an inner surface of the case 212.

The linear thermal expansion coefficient of Al which configures the main constituent of the bearing housing 225 (the second linear thermal expansion coefficient) is 23 to 24 ppm/° C., and the linear thermal expansion coefficient of Fe which configures the main constituents of the output shaft 15, the tapered roller bearing 11 and the preload member 236 (the first and third linear thermal expansion coefficients) is about 12 to 13 ppm/° C. In addition, in general, a bearing utilization environmental temperature in a transmission is in the range of −40° C. or higher to 150° C. or lower (a normal ultimate temperature excluding cold regions and continuous driving at high speeds is 50° C. or higher and 80° C. or lower).

As is shown in FIG. 3, the preload imparting mechanism 230 is such as to impart an axially inward preload to the tapered roller bearing 211 and includes a bottomed cylindrical cylinder 243 which is provided in the bearing housing 225 and a pressure supply unit 44 which is connected to the cylinder 243 for supplying an oil pressure (a fluid pressure) to an interior of the cylinder 243. The preload member 236 is fitted in the cylinder 243 so as to slide in the axial direction, and a space defined between an inner surface of the cylinder 243 and the closure portion 236a of the preload member 236 is made to configure an oil pressure chamber (a fluid pressure chamber) 245.

A solid lubricant is coated on an outer circumferential surface of the cylindrical portion 236b of the preload member 236 in order to provide a smooth sliding. As the solid lubricant, it is possible to use, for example, a fluorocarbon resin such as polytetrafluoroethylene, molybdenum disulfide, graphite, molybdenum and resins in which they are dispersed. The pressure supply unit 44 includes an oil line (a flow path) 47 which is connected to the oil pressure chamber 45 via a through hole 246 which is formed in a bottom wall of the cylinder 243 and a hydraulic pump 48 for causing an oil to flow along the oil line 47.

When oil is supplied to the oil pressure chamber 245 via the oil line 47 and the through hole 246 by the operation of the hydraulic pump 48, as is shown in FIG. 4, an axially inward (rightward) preload is imparted to the outer ring 232 via the preload member 236. The outer ring 232 receives a component of force from the inclined rolling surfaces of the tapered rollers 34 to thereby be displaced axially and radially, and a radial preload is supported by the outer circumferential force of the outer ring 232 being pressed against an inner circumferential surface of the cylindrical portion 236 and the outer circumferential surface of the cylindrical portion 236b being pressed against the inner circumferential surface of the bearing housing 225. The preload applied to the outer ring 232 is made to be adjusted in accordance with a pressure under which oil is sent by the hydraulic pump 48.

In addition, as is shown in FIG. 3, the preload imparting mechanism 230 also includes a pressure discharging unit 50. This pressure discharging unit 50 is such as to discharge oil in the oil pressure chamber 245 so as to release the preload when the pressure inside the oil pressure chamber 245 is increased to thereby produce an excessive preload in the tapered roller bearing 211. The oil so discharged is made to flow into an oil pressure tank for the hydraulic pump or a discharge container. In addition, in the event that the oil used is the same as a lubricant for the transmission 210, the oil may be discharged into the transmission 210 by the pressure discharging unit 50.

As this pressure discharging unit 50, for example, an opening and closing valve such as a solenoid valve or a relief valve or a differential pressure holding unit such as an orifice or a needle is used. In the case of a solenoid valve being used, a pressure sensor is provided for monitoring an internal pressure of the pressure supply unit 44 (an internal pressure of the oil pressure chamber 245 or the through hole 246, a pressure under which oil is sent by the hydraulic pump 48). When the internal pressure is increased excessively, by opening the solenoid valve provided in the oil line 47, the oil is discharged, so as to make proper the internal pressure. In the case of a relief valve being used, a pressure is set in advance so that the relieve valve is opened to discharge the oil when the internal pressure in the oil pressure chamber 245 exceeds a certain pressure. In the case of an orifice or a needle being used, they are set to obtain a proper internal pressure.

In the case of a check valve being provided in the oil line 47 or the through hole 246 so as to prevent the oil from flowing in a reverse direction from the oil pressure chamber 245 to the hydraulic pump 48 side, a separate oil line may be connected to the oil pressure chamber 245, while the solenoid valve or the relief valve is provided, so that when the pressure inside the oil pressure chamber 245 exceeds a predetermined pressure, the solenoid valve or the relief valve is opened so as to discharge the oil from the separate oil line.

Hereinafter, the operation of the rolling bearing apparatus according to the second embodiment will be described.

As has been described, the axial preload is imparted to the outer ring 232 of the tapered roller bearing 211 via the preload member 262 by supplying the oil pressure from the hydraulic pump 48 to the oil pressure chamber 245. Since the preload member 236 enables the oil pressure from the pressure supply unit 44 to be received by the closure portion 236a having a wide area, a large magnitude of force can be made to act on the outer ring 232 even with a small magnitude of oil pressure. Consequently, a hydraulic pump with a small capacity can be used as the hydraulic pump 48, thereby making it possible to realize a reduction in size and production cost of the preload imparting mechanism 30.

When the temperature of the transmission 210 is maintained constant at a relatively low temperature, there is caused almost no difference in dimension change due to thermal expansion of the bearing housing 225, the preload member 236, the outer ring 232 and the output shaft 15, and the preload is maintained constant.

When the temperature of the transmission 210 is increased, since the linear thermal expansion coefficient of the transmission 210 and the bearing housings 225, 226 is larger than the linear thermal expansion coefficient of the output shaft 15, the transmission 210 and the bearing housings 225, 226 expand largely in the axial direction, whereby the outer ring 232 attempts to move away from the tapered rollers 34.

In addition, since the linear thermal expansion coefficient of the bearing housing 225 is larger than the linear thermal expansion coefficient of the tapered roller bearing 211 and the preload member 236, the inner circumferential surface of the bearing housing 225 (the cylinder 243) expands diametrically to thereby attempt to move away from the outer circumferential surface of the cylindrical portion 236b. Namely, the supporting position of the outer circumferential surface of the cylindrical portion 236c by the inner circumferential surface of the bearing housing 225 changes radially outwards, whereby the reaction force to the preload member 236 by the bearing housing 225 is reduced.

As this occurs, the preload member 236 and the outer ring 232 are pressed axially inwards (rightwards) by the oil pressure from the hydraulic pump 48 and move to a position where the preload imparted to the preload member 236 and the outer ring 232 is balanced with the reaction force from the bearing housing 225. As a result, even though the supporting position of the outer circumferential surface of the cylindrical portion 236b by the inner circumferential surface of the bearing housing 225 is moved by the increase in temperature, the preload against the preload member 236 and the outer ring 232 is maintained almost constant.

In addition, as is shown in FIG. 4, when the inner circumferential surface of the bearing housing 225 expands diametrically to thereby move away from the outer circumferential surface of the cylindrical portion 236b, the O-rings 253 which are provided on the bearing housing 225 are restored elastically so as to maintain the state in which the O-rings 253 are in press contact with (are closely attached to) the outer circumferential surface of the cylindrical portion 236*b*. In addition, since the O-rings 253 are made of rubber and have the liner thermal expansion coefficient (the fourth linear thermal expansion coefficient) which is larger than the linear thermal expansion coefficient of the bearing housing 225, the O-rings 253 expand larger than the bearing housing 225 so as to be closely attached to the outer circumferential surface of the cylindrical portion 236*b* when the temperature thereof is increased. Consequently, oil is prevented from leaking from a space that would otherwise be produced between the inner circumferential surface of the bearing housing 225 and the outer circumferential surface of the cylindrical portion 236*b*, thereby making it possible to maintain the preload.

Further, since the plurality of O-rings 253 are provided so as to be spaced apart in the axial direction, not only can the oil leakage be prevented in a more ensured fashion, but also the operation of the hydraulic pump 48 can be suppressed to thereby realize the saving of energy. In addition, by the plurality of O-rings 253 being provided so as to be spaced apart in the axial direction, the inclination of the preload member 236 can be prevented which would otherwise occur when the inner circumferential surface of the bearing housing 225 expands diametrically.

By the outer ring 232 being fitted into the preload member 236, the rigidity of the outer ring 232 is enhanced, whereby even in the event that a space is produced between the inner circumferential surface of the bearing housing 225 and the outer circumferential surface of the cylindrical portion 236*b* in association with an increase in the temperature of the transmission 210, the deterioration in roundness of the raceway can be suppressed, so as to maintain the performance of the bearing.

Since the preload member 236 includes the cylindrical portion 236*b* and the closure portion 236*a* and the outer ring 232 is fitted in the cylindrical portion 236*b*, when the inner circumferential surface of the bearing housing expands diametrically, there is no such case that the outer ring 232 and the preload member 236 are inclined separately, and there is no such case that wear is caused due to a relative offset in position between these two constituent members. In addition, since the flange portion 236*c* is formed on the preload member 236, by this flange portion 236*c* being brought into abutment with the end face of the bearing housing 225, the inclination of the preload member 236 can be suppressed.

When the temperature of the transmission 210 decreases, the bearing housing 225 thermally shrinks axially and radially, and the oil pressure chamber 245 is reduced in size. By this, the oil within the oil pressure chamber 245 is pressurized, and an excessive preload is caused to act on the tapered roller bearing 11. As this occurs, as is shown in FIG. 3, the pressure discharging unit 50 is allowed to function to discharge the oil from the oil pressure chamber 245 to thereby maintain proper the pressure in the oil pressure chamber 245.

Also when impact load is applied to the output shaft 15 in a reverse direction to the direction in which the preload is imparted (axially outwards) due to changing the gear ratios of the transmission 210 or engaging or disengaging a clutch (whose illustration is omitted), the outer ring 232 and the preload member 236 move outwards in the axial direction against the oil pressure by the hydraulic pump 48 via the inner ring 33 and the tapered rollers 34, whereby an excessive preload is caused to act on the tapered roller bearing 211. However, in this case, too, the pressure discharging unit 50 is allowed to function to discharge the oil within the oil pressure chamber 245, so as to maintain proper the pressure in the oil pressure chamber 245.

In addition, even though the pressure in the oil pressure chamber 245 is increased momentarily by the application of the impact load, since the plurality of O-rings 253 are provided on the outer ring 232, the oil leakage from a space can be prevented which would otherwise be produced between the inner circumferential surface of the bearing housing 225 and the outer circumferential surface of the outer ring 232.

Further, since the preload member 236 is prevented from moving axially outwards more than a predetermined amount by the flange portion 236*c* being brought into abutment with the end face 225*a* of the bearing housing 225, there is no such case that the oil pressure chamber 245 is contracted more than a predetermined amount by the impact load or the like to thereby increase the pressure in the oil pressure chamber 245 excessively, thereby making it possible to prevent the oil leakage in a more ensured fashion.

The invention does not have to be limited to the embodiment that has been described heretofore but can be modified in design as required. For example, with the flange portion 236*c* omitted, the preload member 236 can be configured only by the cylindrical portion 236*b* and the closure portion 236*a*. In addition, the preload member 236 does not have to be configured integrally by the cylindrical portion 236*b*, the closure portion 236*a* and the flange portion 236*c*, but these constituent members can be formed individually or separately and can be connected together by appropriate connecting unit (welding, screwing or the like).

Figure 5:
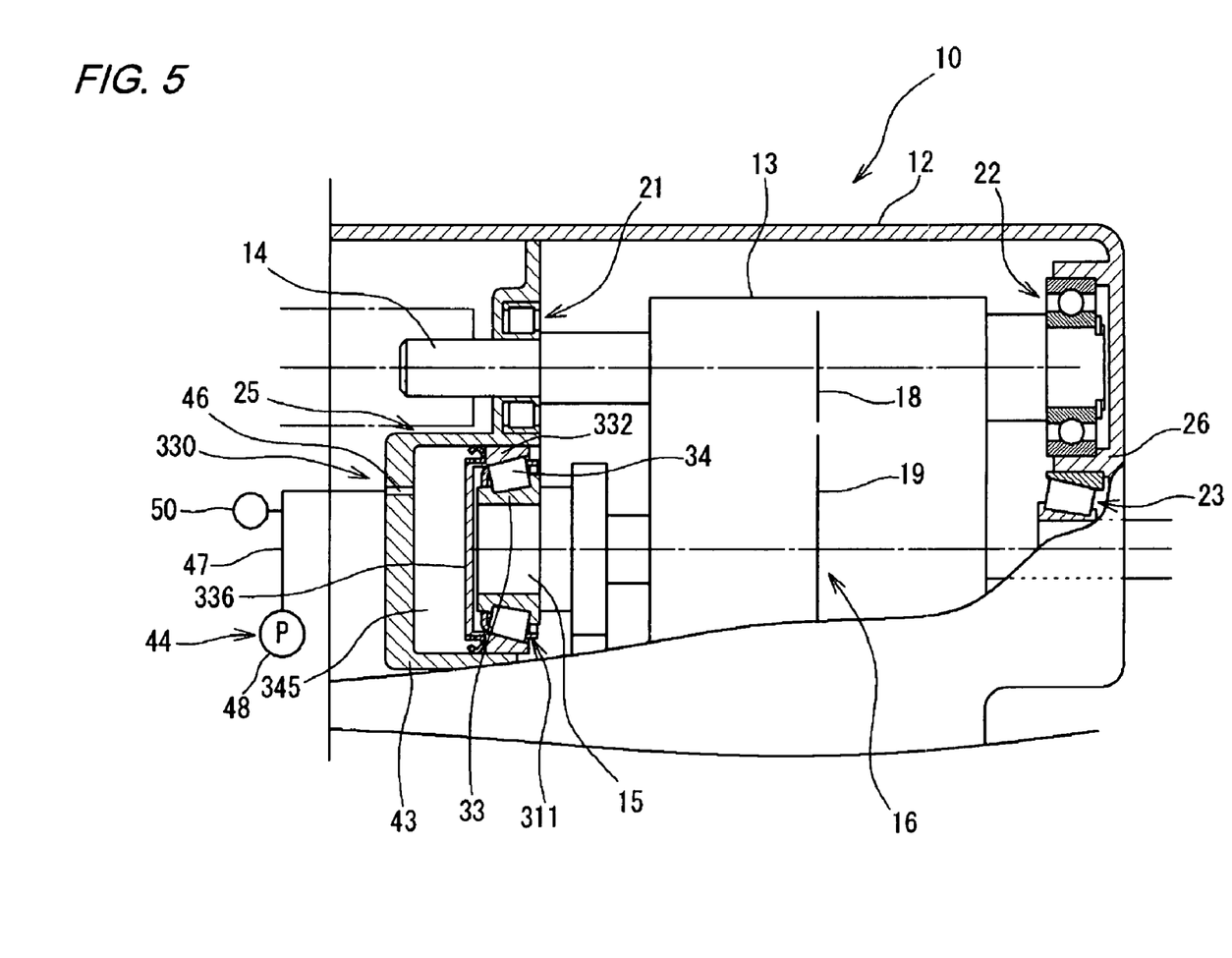
FIG. 5 is a sectional view showing a transmission which is a rolling bearing apparatus according to an embodiment of the invention.
Figure 6:
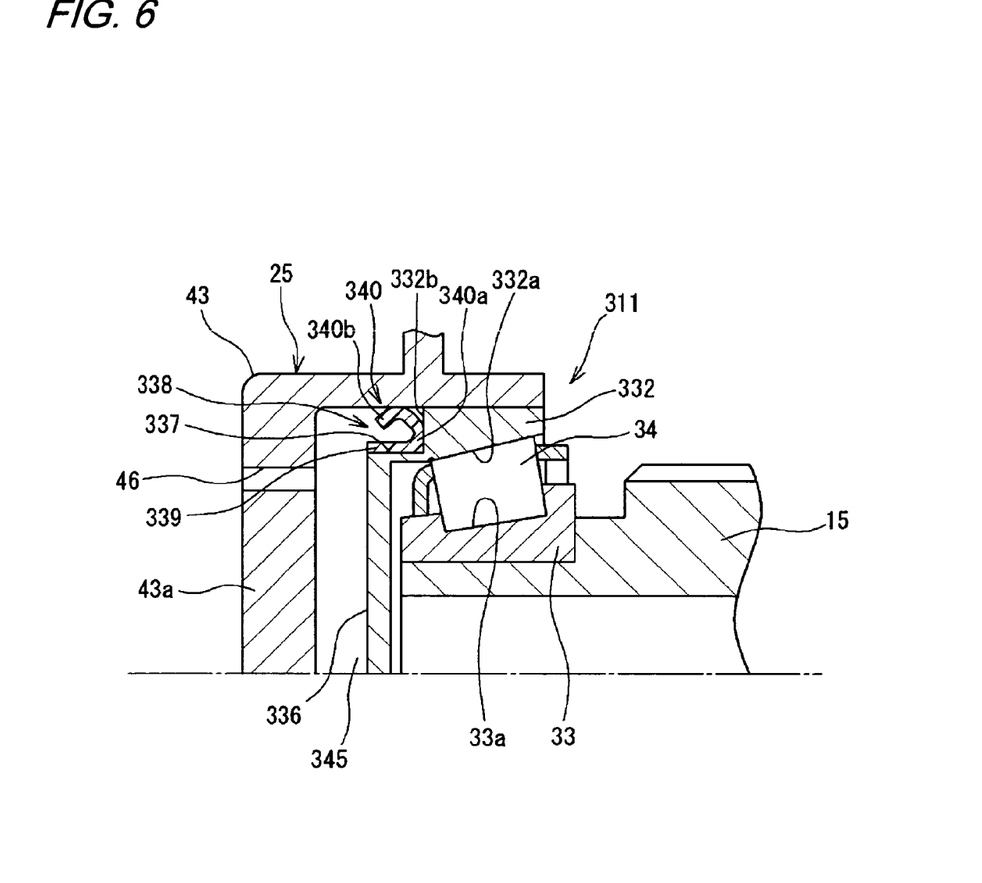
FIG. 6 is an enlarged sectional view of a main part of the rolling bearing apparatus.

FIG. 5 is a side sectional view of a rolling bearing apparatus according to a third embodiment of the invention. FIG. 6 is a sectional view showing a main part of the invention in an enlarged fashion. Since a basic configuration of the rolling bearing apparatus according to the third embodiment is the same as that of the first embodiment that has been described before, mainly different features will be described. Like reference numerals will be given to like configurations and like constituent members, and a detailed description thereof will be omitted. The rolling bearing apparatus according to the third embodiment employs a tapered roller bearing 311 which is different from the tapered roller bearing 11 of the first embodiment.

In the third embodiment, a closure member (a preload member) 336 is provided on an outer ring 332 of a left-hand side tapered roller bearing 311. This closure member 336 is formed integrally with the outer ring 332 at an axially outer end portion (a left end portion) of the outer ring 332 so as to close an inner circumferential side opening of the outer ring 332. Consequently, the outer ring 332 has a configuration in which it is constructed to be solid at the axially outer end portion and is opened only at an axially inner end portion.

In addition, an outer circumferential surface of the outer ring 332 is made smaller in diameter at the axially outer end portion (the left end portion) by being caused to fall radially inwards via a connecting surface 332*b* which follows along a radial direction, and a seal member 388 is fitted on an outer circumferential surface of the small diameter portion 337. The seal member 338 is a pressure-resistant seal made of a reinforced rubber and has a radial dimension which is larger than a radial dimension of the connecting surface 332*b*. The seal member 338 has a cylindrical portion 339 which fits on an outer circumferential surface of the small diameter portion 337 and a lip portion 340 which projects radially outwards and axially outwards (leftwards) from the cylindrical portion 339. As the material of the rubber used for the seal member 338, in consideration of the contact with an oil in a preload imparting mechanism 330, rubbers which can satisfy both mechanical strength and resistance to oil are preferred, and they include, for example, nitril rubber (in particular, hydrogenated nitril rubber), acrylic rubber, silicone rubber and fluorocarbon rubber.

The lip portion 340 has an annular portion 340a which extends radially outwards from an axially inner end portion (a right end portion) of the cylindrical portion 339 as a proximal end and an abutment portion 340b which extends axially outwards (leftwards) from a radially outer end portion of the annular portion 340a. An outer circumferential surface of the abutment portion 340b is made into an angular surface which is tapered radially outwards. The lip portion 340 is brought into press contact with an inner circumferential surface of a bearing housing 25 by being deformed elastically radially inwards. In addition, the configuration of the lip portion 340 is not limited to that described above but may be formed into a configuration in which it extends obliquely in a linear fashion from the cylindrical portion 337 radially outwards and axially outwards.

The outer ring 332 of the tapered roller bearing 311 has a first linear thermal expansion coefficient. In contrast to this, the bearing housing 25 has a second linear thermal expansion coefficient which is larger than the first linear thermal expansion coefficient. In addition, an output shaft 15 has a third linear thermal expansion coefficient which is smaller than the second linear thermal expansion coefficient.

For example, in the tapered roller bearing 311, the outer ring 332, an inner ring 33 and roller elements 34 are all formed of a steel (for example, a bearing steel, a case hardening steel, a carburizing steel), the bearing housing 25 is formed of a light metal (a metal in which either Al or Mg configures a main constituent (the content is 50% by mass or more), and the output shaft 15 is formed of a steel (for example, a machine construction low alloy steel). Preferably, Al or an Al alloy is used for the bearing housing 25 from the viewpoint of workability and resistance to corrosion, and as the Al alloy, for example, an Al alloy for die casting is used. In this embodiment, a case 12 (FIG. 1) is also made of the Al alloy, and the bearing housing 25 is integrated with an inner surface of the case 12.

The linear thermal expansion coefficient of Al which configures the main constituent of the bearing housing 25 (the second linear thermal expansion coefficient) is 23 to 24 ppm/° C., and the linear thermal expansion coefficient of Fe which configures the main constituents of the output shaft 15 and the tapered roller bearing 11 (the first and third linear thermal expansion coefficients) is about 12 to 13 ppm/° C. In addition, in general, a bearing utilization environmental temperature in a transmission is in the range of −40° C. or higher to 150° C. or lower (a normal ultimate temperature excluding cold regions and continuous driving at high speeds is 50° C. or higher and 80° C. or lower).

As is shown in FIG. 5, the preload imparting mechanism 330 is such as to impart an axially inward preload to the tapered roller bearing 311 and includes a bottomed cylindrical cylinder 43 which is provided in the bearing housing 25 and a pressure supply unit 44 which is connected to the cylinder 43 for supplying an oil pressure (a fluid pressure) to an interior of the cylinder 43. The outer ring 332 is fitted in the cylinder 43 so as to slide in the axial direction, and a space defined between an inner circumferential surface of the cylinder 43 and the closure member 336 of the outer ring 332 is made to configure an oil pressure chamber 345 (a fluid pressure chamber). A solid lubricant is coated on the outer circumferential surface of the outer ring 332 in order to provide a smooth sliding. As the solid lubricant, it is possible to use, for example, a fluorocarbon resin such as polytetrafluoroethylene, molybdenum disulfide, graphite, molybdenum and resins in which they are dispersed. The pressure supply unit 44 includes an oil line (a flow path) 47 which is connected to the oil pressure chamber 345 via a through hole 46 which is formed in a bottom wall of the cylinder 43 and a hydraulic pump 48 for causing an oil to flow along the oil line 47.

When oil is supplied to the oil pressure chamber 345 via the oil line 47 and the through hole 46 by the operation of the hydraulic pump 48, an axially inward (rightward) preload is imparted to the outer ring 332. The outer ring 332 receives a component of force from inclined rolling surfaces of the tapered rollers 34 to thereby be displaced axially and radially, and a radial preload is supported by the outer circumferential force of the outer ring 332 being pressed against the inner circumferential surface of the cylinder 43. The preload applied to the outer ring 332 is made to be adjusted in accordance with a pressure under which oil is sent by the hydraulic pump 48.

In addition, the preload imparting mechanism 330 also includes a pressure discharging unit 50. This pressure discharging unit 50 is such as to discharge oil in the oil pressure chamber 345 so as to release the preload when the pressure inside the oil pressure chamber 345 is increased to thereby produce an excessive preload in the tapered roller bearing 311. The oil so discharged is made to flow into an oil pressure tank for the hydraulic pump or a discharge container. In the event that the oil used is the same as a lubricant for a transmission 10, the oil may be discharged into the transmission 10 by the pressure discharging unit 50.

As this pressure discharging unit 50, for example, an opening and closing valve such as a solenoid valve or a relief valve or a differential pressure holding unit such as an orifice or a needle is used. In the case of a solenoid valve being used, a pressure sensor is provided for monitoring an internal pressure of the pressure supply unit 44 (an internal pressure of the oil pressure chamber 345 or the through hole 46, a pressure under which oil is sent by the hydraulic pump 48). When the internal pressure is increased excessively, by opening the solenoid valve provided in the oil line 47, the oil is discharged, so as to make proper the internal pressure. In the case of a relief valve being used, a pressure is set in advance so that the relief valve is opened when the internal pressure in the oil pressure chamber 345 exceeds a certain pressure. In the case of an orifice or a needle being used, they are set to obtain a proper internal pressure.

In the case of a check valve being provided in the oil line 47 or the through hole 46 so as to prevent the oil from flowing in a reverse direction from the oil pressure chamber 45 to the hydraulic pump 48 side, a separate oil line may be connected to the oil pressure chamber 345, while the solenoid valve or the relief valve is provided, so that when the pressure inside the oil pressure chamber 345 exceeds a predetermined pressure, the solenoid valve or the relief valve is opened so as to discharge the oil from the separate oil line.

The operation of the rolling bearing apparatus according to the third embodiment will be described.

As has been described, the axial preload is imparted to the outer ring 332 of the tapered roller bearing 311 by supplying the oil pressure from the hydraulic pump 48 to the oil pressure chamber 345, and the outer circumferential surface of the outer ring 332 is pressed against the inner circumferential surface of the bearing housing 25 (the cylinder 43) to thereby be supported thereon. The closure member 336 is provided on the outer ring 332, and since the closure member 336 enables the oil pressure to be received by a wide area, a large magnitude of force can be made to act on the outer ring 332 even with a small magnitude of oil pressure. Consequently, a hydraulic pump with a small capacity can be used as the hydraulic pump 48, thereby making it possible to realize a reduction in size and production cost of the preload imparting mechanism 330.

When the temperature of the transmission 10 is maintained constant at a relatively low temperature, there is caused almost no difference in dimension change due to thermal expansion of the bearing housing 25, the outer ring 32 and the output shaft 15, and the preload is maintained constant.

When the temperature of the transmission 10 is increased, since the linear thermal expansion coefficient of the transmission 10 and the bearing housings 25, 26 is larger than the linear thermal expansion coefficient of the output shaft 15, the transmission 10 and the bearing housings 25, 26 expand largely in the axial direction, whereby the outer ring 332 attempts to move away from the tapered rollers 34.

In addition, since the linear thermal expansion coefficient of the bearing housing 25 is larger than the linear thermal expansion coefficient of the tapered roller bearing 311, the inner circumferential surface of the bearing housing 25 (the cylinder 43) expands diametrically to thereby attempt to move away from the outer circumferential surface of the outer ring 332. Namely, the supporting position of the outer circumferential surface of the outer ring 332 by the inner circumferential surface of the bearing housing 25 changes radially outwards, whereby the reaction force to the outer ring 332 by the bearing housing 25 is reduced.

As this occurs, the outer ring 332 is pressed axially inwards by the oil pressure from the hydraulic pump 48 and moves to a position where the preload imparted to the outer ring 332 is balanced with the reaction force from the bearing housing 25. As a result, even though the supporting position of the outer circumferential surface of the outer ring 332 is moved by the increase in temperature, the preload against the outer ring 332 is maintained almost constant.

In addition, as is shown in FIG. 6, when the inner circumferential surface of the bearing housing 25 expands diametrically to thereby move away from the outer circumferential surface of the outer ring 332, following the inner circumferential surface of the bearing housing 25, the lip portion 340 of the seal member 338 provided on the outer ring 332 is restored elastically so as to maintain the state in which the lip portion 340 is in press contact with (is closely attached to) the inner circumferential surface of the bearing housing 25. Consequently, almost no oil leaks from a space that would otherwise be produced between the inner circumferential surface of the bearing housing 25 and the outer circumferential surface of the outer ring 332, whereby not only can the preload be maintained, but also the operation of the hydraulic pump 48 can be suppressed, thereby making it possible to save energy.

When the temperature of the transmission 10 decreases, the bearing housing 25 thermally shrinks axially and radially, and the oil pressure chamber 345 is reduced in size. By this, the oil within the oil pressure chamber 345 is pressurized, and an excessive preload is caused to act on the tapered roller bearing 311. As this occurs, as is shown in FIG. 5, the pressure discharging unit 50 is allowed to function to discharge the oil from the oil pressure chamber 345 to thereby maintain proper the pressure in the oil pressure chamber 345.

In addition, also when impact load is applied to the output shaft 15 in a reverse direction to the direction in which the preload is imparted (axially outwards) due to changing the gear ratios of the transmission 10 or engaging or disengaging a clutch (whose illustration is omitted), the outer ring 332 moves in the axial direction against the oil pressure by the hydraulic pump 48 via the inner ring 33 and the tapered rollers 34, whereby an excessive preload is caused to act on the tapered roller bearing 311. However, the pressure discharging unit 50 is allowed to function to discharge the oil within the oil pressure chamber 345, so as to maintain proper the pressure in the oil pressure chamber 345.

In addition, even though the pressure in the oil pressure chamber 345 is increased momentarily by the application of the impact load, since the seal member 338 made up of the pressure-resistant seal is provided on the outer ring 332, almost no oil leaks from a space which would otherwise be produced between the inner circumferential surface of the bearing housing 25 and the outer circumferential surface of the outer ring 332.

In addition, the closure member 336 can be configured separately from the outer ring 332. However, as in the embodiment, since the rigidity of the outer ring 332 can be enhanced by the outer ring 332 being formed integrally with the closure member 336, even in the event that a space is produced between the inner circumferential surface of the bearing housing 332 and the outer circumferential surface of the outer ring 332 in association with an increase in the temperature of the transmission 10, the deterioration in roundness of the raceway can be suppressed, thereby making it possible to maintain the performance of the bearing. In addition, in the event that the outer ring 332 and the closure member 336 are formed as separate members, when the inner circumferential surface of the bearing housing 25 expands diametrically, the outer ring 332 and the closure member 336 tend to be easily inclined individually, whereby the outer ring 332 and the closure member 336 are offset from each other, leading to a fear that they are caused to rub against each other to generate wear thereof. However, by the outer ring 332 and the closure member 336 being formed integrally with each other, the aforesaid defective can be prevented from being caused.

The invention does not have to be limited to the embodiments that have been described heretofore but can be modified variously in design. For example, in the embodiments, while the invention is described as being applied to the rolling bearing apparatus that is used in the transmission, the invention can be applied to other apparatuses including a drive apportioning gear unit for a four-wheel-drive vehicle.

In addition, as the rolling bearing, the invention is not limited to the tapered roller bearing but may be applied to other rolling bearings such as an angular contact ball bearing, a deep groove ball bearing and the like which employ preloads.

The invention claimed is:

1. A rolling bearing apparatus comprising:
  a rolling bearing comprising:
    rolling elements;
    an inner ring which includes a raceway surface on which the rolling elements roll on an outer circumference thereof; and
    an outer ring which includes a raceway surface on which the rolling elements roll and which receives a radial load and a load directed to one side of an axial direction from the rolling elements on an inner circumference thereof,
    wherein a closure member for closing an inner circumferential side opening of the outer ring is formed integrally at an end portion of the outer ring which lies on the one side of the axial direction such that the closure member and the outer ring comprise a same member, and
    wherein the outer ring has a first linear thermal expansion coefficient;
  a bearing housing which includes an inner circumferential surface in which an outer circumferential surface of the outer ring fits and which has a second linear thermal expansion coefficient which is larger than the first linear thermal expansion coefficient;

a rotational shaft which fits in an inner circumferential surface of the inner ring and which has a third linear thermal expansion coefficient which is smaller than the second linear thermal expansion coefficient; and a preload imparting mechanism for imparting a preload directed to an other side of the axial direction to the outer ring by a fluid pressure, wherein the closure member is formed in such a manner that a fluid pressure by the preload imparting mechanism is applied thereto.

2. A rolling bearing apparatus as set forth in claim 1, wherein a plurality of O-ring mounting circumferential grooves are formed on the outer circumferential surface of the outer ring so as to be spaced apart in the axial direction, and wherein O-rings mounted in the circumferential grooves are brought into press contact with the inner circumferential surface of the bearing housing.

3. A rolling bearing apparatus as set forth in claim 1, comprising a seal member including a lip portion which projects radially outwards and to the one side of the axial direction from the outer circumferential surface of the outer ring, and wherein the lip portion is brought into abutment with the inner circumferential surface of the bearing housing.

* * * * *